(12) United States Patent
Kassar et al.

(10) Patent No.: US 11,046,304 B2
(45) Date of Patent: Jun. 29, 2021

(54) RIDER SELECTABLE RIDE COMFORT SYSTEM FOR AUTONOMOUS VEHICLE

(71) Applicant: Argo AI, LLC, Pittsburgh, PA (US)

(72) Inventors: Alice Kassar, Detroit, MI (US); Bryan Salesky, Cranberry Township, PA (US); Scott Julian Varnhagen, Ann Arbor, MI (US)

(73) Assignee: Argo AI, LLC, Pittsburgh, PA (US)

( * ) Notice: Subject to any disclaimer, the term of this patent is extended or adjusted under 35 U.S.C. 154(b) by 246 days.

(21) Appl. No.: 16/403,719

(22) Filed: May 6, 2019

(65) Prior Publication Data

US 2020/0148195 A1    May 14, 2020

Related U.S. Application Data

(60) Provisional application No. 62/758,886, filed on Nov. 12, 2018.

(51) Int. Cl.
*B60W 30/02* (2012.01)
*G05D 1/00* (2006.01)
(Continued)

(52) U.S. Cl.
CPC .......... *B60W 30/025* (2013.01); *B60W 10/04* (2013.01); *B60W 10/18* (2013.01); *B60W 10/20* (2013.01); *B60W 30/18109* (2013.01); *B60W 30/18145* (2013.01); *G05D 1/0088* (2013.01); *B60W 2400/00* (2013.01);
(Continued)

(58) Field of Classification Search
CPC ......... B60W 30/025; B60W 30/18145; B60W 10/20; B60W 10/18; B60W 30/18109; B60W 2710/18; B60W 2400/00; B60W 2720/106; B60W 2710/205; B60W 30/14; B60W 10/22; B60W 30/18; B60W 30/182; B60W 50/06; B60W 40/02; B60W 40/105; B60W 50/00; G05D 1/0088; G05D 2201/0213; B60R 21/0134; B60L 11/18; B60L 15/20; B60T 8/32
See application file for complete search history.

(56) References Cited

U.S. PATENT DOCUMENTS 9,475,496 B2   10/2016   Attard et al.
9,517,771 B2   12/2016   Attard et al.
(Continued)

FOREIGN PATENT DOCUMENTS

JP    2011116260 A    6/2011

*Primary Examiner* — Marthe Y Marc-Coleman
(74) *Attorney, Agent, or Firm* — Fox Rothschild LLP

(57) ABSTRACT

An autonomous mode controller of an autonomous vehicle according to various rider-selectable comfort configurations. When the controller identifies a comfort configuration, it will access a configuration data set that corresponds to the selected comfort configuration. The controller also will receive sensor data from one or more autonomous driving sensors. In response to the received sensor data, the controller will generate an instruction for operation of a steering, braking, powertrain or other subsystem for operation of the autonomous vehicle. The instruction while includes values that correspond to the sensed data and to one or more parameters of the configuration data set. The subsystem will then cause the autonomous vehicle to move according to the instruction.

23 Claims, 3 Drawing Sheets

(51) Int. Cl.
*B60W 30/18* (2012.01)
*B60W 10/20* (2006.01)
*B60W 10/04* (2006.01)
*B60W 10/18* (2012.01)

(52) U.S. Cl.
CPC ... *B60W 2710/18* (2013.01); *B60W 2710/205* (2013.01); *B60W 2720/106* (2013.01); *G05D 2201/0213* (2013.01)

(56) References Cited

U.S. PATENT DOCUMENTS

| | | |
|---|---|---|
| 10,053,105 B2 | 8/2018 | Foster et al. |
| 10,157,423 B1 | 12/2018 | Fields et al. |
| 2013/0041536 A1 | 2/2013 | Power et al. |
| 2014/0039743 A1* | 2/2014 | Park ............... B60L 3/0046 |
| | | 701/22 |
| 2016/0375906 A1* | 12/2016 | Jeon ............... B60W 30/182 |
| | | 701/54 |
| 2017/0038775 A1 | 2/2017 | Park |
| 2018/0141562 A1 | 5/2018 | Singhal |
| 2018/0170387 A1* | 6/2018 | Park ............... B60W 30/18145 |
| 2018/0194365 A1 | 7/2018 | Bae et al. |
| 2018/0208209 A1 | 7/2018 | Al-Dahle et al. |
| 2018/0356830 A1 | 12/2018 | Haghighat et al. |
| 2018/0361972 A1 | 12/2018 | Zagorski |

\* cited by examiner

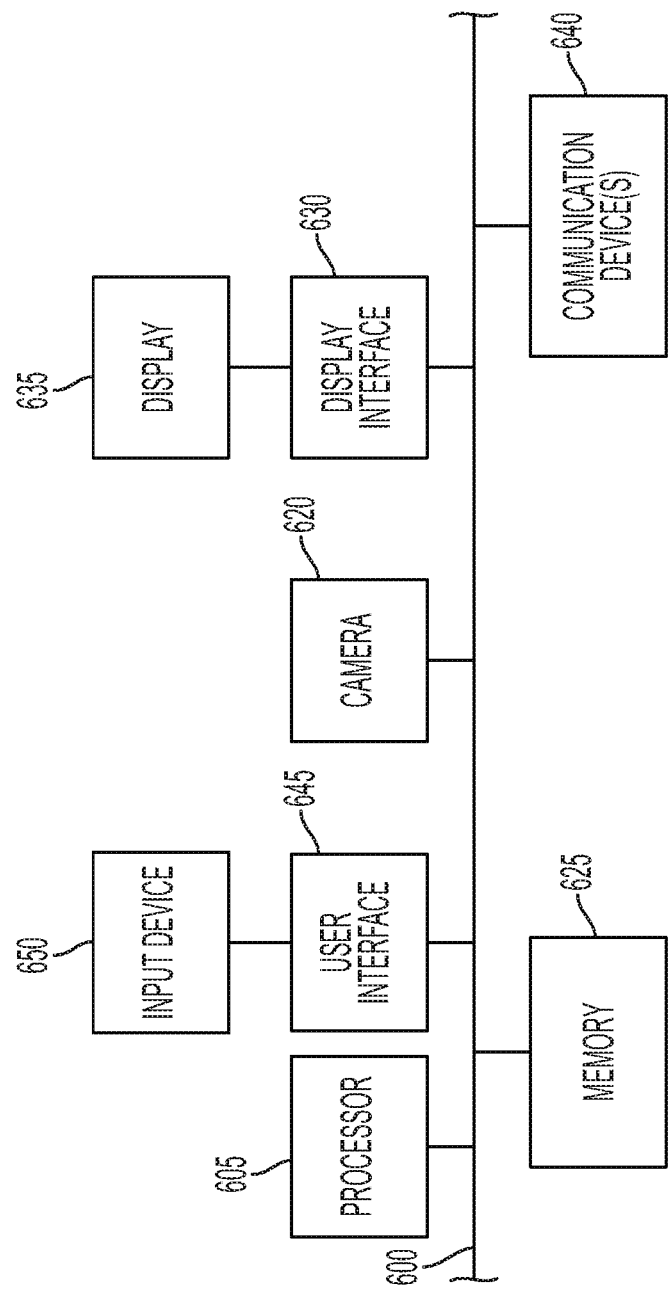

RIDER SELECTABLE RIDE COMFORT SYSTEM FOR AUTONOMOUS VEHICLE

CROSS-REFERENCE TO RELATED APPLICATION

This application claims priority to U.S. Provisional Patent Application No. 62/758,886, filed Nov. 12, 2018, the disclosure of which is incorporated herein by reference in its entirety.

BACKGROUND

Different riders who use an autonomous vehicle may have different preferences for the driving character of their autonomous vehicle trip. For example, one rider may prefer to travel quickly and may not be bothered by moderate accelerations. A different user may prioritize a smooth and uneventful ride over speed, while being irritated by modest accelerations.

This disclosure relates to system and method for controlling operation of an autonomous vehicle that addresses the issues listed above.

SUMMARY

An autonomous mode controller of an autonomous vehicle operates various subsystems of the vehicle according to various rider-selectable comfort configurations. When the controller identifies a comfort configuration, it will access a configuration data set that corresponds to the selected comfort configuration. The controller also will receive sensor data from one or more autonomous driving sensors. In response to the received sensor data, the controller will generate an instruction for operation of a steering, braking, powertrain or other subsystem for operation of the autonomous vehicle. The instruction will include values that correspond to the sensed data and to one or more parameters of the configuration data set. The subsystem will then cause the autonomous vehicle to move according to the instruction.

BRIEF DESCRIPTION OF THE DRAWINGS

FIG. 3 is a block diagram of elements of computing hardware on which certain systems and methods in this document could be implemented.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "autonomous vehicle" is a land-based, airborne or water-based machine that is configured to transport one or more passengers and/or cargo, and which includes a robotic transport system, a processor, and programming instructions that are configured to enable the processor to command the robotic transport system to move the vehicle through an environment without the requirement for human steering or other direction in at least some situations. The transport system may be a motor and set of wheels and/or rollers (in case of a land-based vehicle), or propellers and/or propulsion systems (in case of an unmanned aerial vehicle). An autonomous vehicle may be fully autonomous and require no action by a human operator other than identification of a destination, such that the vehicle is designed to perform all safety-critical driving functions and monitor roadway conditions for an entire trip, or in some embodiments it may even handle every driving scenario without driver assistance. Alternatively, an autonomous vehicle may be semi-autonomous in that it requires human operator assistance to handle safety-critical functions under certain traffic or environmental conditions.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, vehicle diagnostic or monitoring systems, other vehicle electronic and/or computing systems, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. The server may be a single device or a collection of devices that are distributed but via which share processing devices and/or memory are shared. In a virtual machine arrangement, a server may be an electronic device, and each virtual machine or container may also be considered to be an electronic device.

Figure 1:
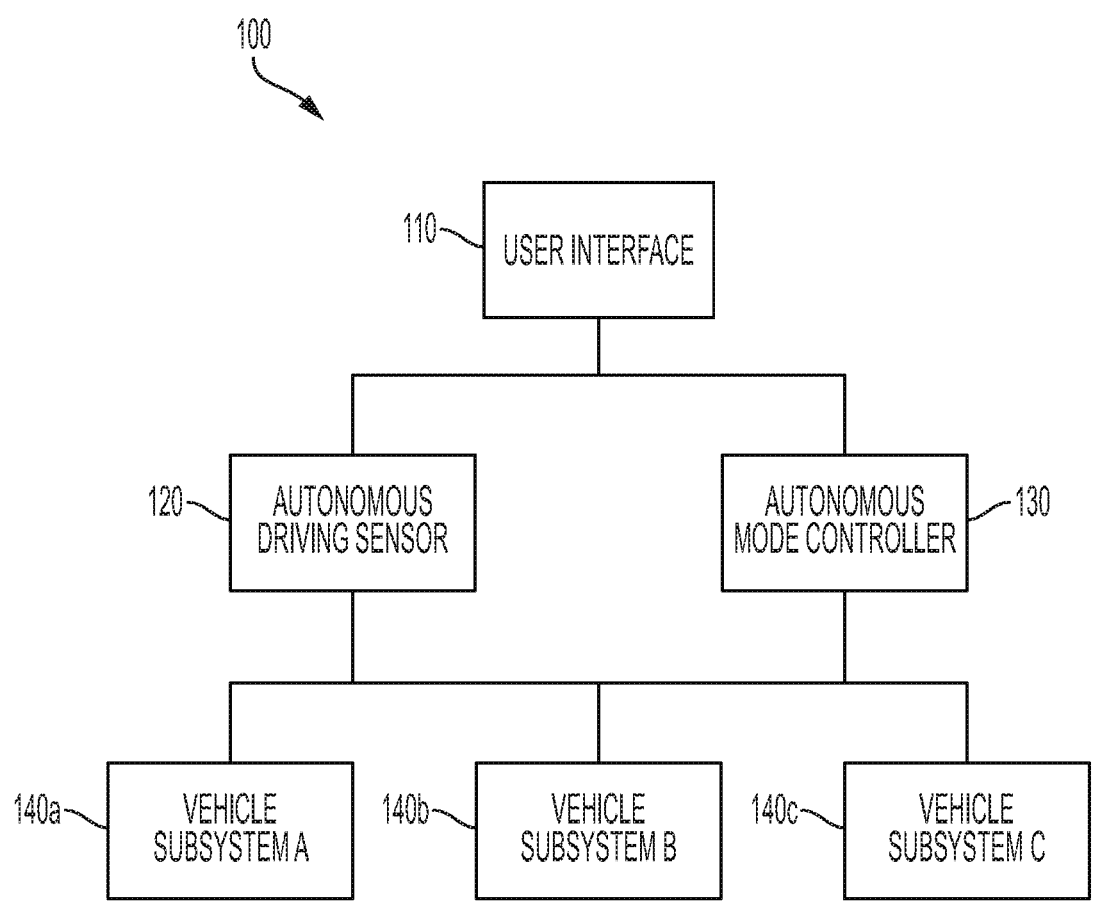
FIG. 1 illustrates example components of a system for operating an autonomous vehicle.

FIG. 1 illustrates example elements of example components of a system 100 for controlling operation of an autonomous vehicle. The system may include a user interface device 110, at least one autonomous driving sensor 120, an autonomous mode controller 130, and various vehicle subsystems 140a-140c. The user interface device 110 may include a display, touchscreen, keypad, other tactile input device, a microphone, and/or an audio output and be configured to present information to and/or receive inputs from a user, such as a rider, during operation of the vehicle. Optionally, the user interface device may be a portable electronic device (such as a smartphone or tablet) that the user carries, and which is in communication with vehicle systems via a communication link such as a near-field or short-range wireless communication link. The autonomous driving sensors 120 may include any number of devices that are configured to receive signals and generate data about the vehicle's position, orientation, movement or environment that can help navigate the vehicle while the vehicle is operating in an autonomous mode. Examples of autonomous driving sensors 120 may include a radar sensor, a LiDAR sensor, an inertial measurement unit (IMU), individual accelerometers and/or gyroscopes, a global positioning system (GPS) sensor, a camera, or the like. The autonomous mode controller 130 includes a processor and programming instructions that are configured to generate signals to control one or more autonomous vehicle subsystems 140a-140c while the vehicle is operating in the autonomous mode. Example autonomous vehicle subsystems 140a-140c include, for example a braking subsystem, a suspension subsystem, a steering subsystem, and a powertrain subsystem. If the vehicle is an electric vehicle, the powertrain subsystem may be an electric vehicle powertrain.

The autonomous mode controller may control any one or more of the autonomous vehicle subsystems by outputting signals to control units associated with these subsystems. The autonomous mode controller may generate these signals based, at least in part, on signals generated by the autonomous driving sensors.

For example, the vehicle's LiDAR sensor may detect an object in front of the vehicle at a certain distance. The detected object data is provided to the processor of the autonomous mode controller. The processor of the autonomous mode controller uses this information to send signals to control units for the associated vehicle's subsystems. In the same example, the processor of the autonomous mode controller may send signals to the braking subsystem, steering subsystem, and powertrain subsystem. The signals to the braking subsystem may signal the vehicle's brakes to slow the vehicle's speed. The signals to the steering subsystem may signal the vehicle's steering mechanism to steer the vehicle around the object. The signals to the powertrain system may signal the vehicle's engine to accelerate the vehicle and signal the transmission of the vehicle to shift upward a gear.

As another example, a camera sensor or image sensor, may detect a red traffic light at a certain distance from the vehicle. The red traffic light data is provided to the processor of the autonomous mode controller. The autonomous mode controller then sends signals to the control units of the vehicle's braking system to slow the vehicle to a stop and signals to the control units of the vehicle's powertrain system to shift the transmission downward one or more gears. The camera sensor may then detect a green traffic light, in which the green traffic light data is provided to the processor of the autonomous mode controller. The autonomous mode controller then sends signals to the powertrain system to signal the vehicle's engine to accelerate the vehicle and signal the transmission of the vehicle to shift upward one or more gears.

Above are examples of the autonomous mode controller using a vehicle's LiDAR sensor and a vehicle's camera sensor to control one or more of the vehicle's subsystems. Other sensors that may be used to control the vehicle's subsystems are a radar sensor, an IMU, individual accelerometers and/or gyroscopes, a GPS sensor, or the like. The autonomous mode controller uses the date from these sensors to control one or more of the vehicle's subsystems in the same manner discussed in the above examples.

The autonomous mode controller will also apply sensed data and other calibration parameters to various rules that are used to instruct vehicle subsystems' operation. These rules may be stored in a memory device that is accessible to the autonomous mode controller. As noted above, many of the rules may be initiated in response to detecting certain sensed data, in which case the rules may be applied to the sensed data to generate the commands for the vehicle subsystem. However, some rules also may consider parameters that could vary. By way of example, a speed limitation rule may include a maximum speed, or a group of possible speeds, at which a vehicle will turn a corner during various sensed conditions. However, the vehicle does not necessarily need to operate at particular speed in each situation. It is possible that a range of speeds could be used, with slower speeds in the range providing a smoother ride and higher speeds in the range providing a more aggressive or "sporty" ride while still operating in safe conditions. In this example, the provided calibration parameters may be the maximum lateral acceleration value for a "sporty" ride and the maximum lateral acceleration value for a "smooth" ride. These lateral acceleration parameters are mapped to allowable speeds based on the curvature of the road (v-max=sqrt(a-lat-max/|curvature|)). These calibration parameters may have been arrived upon by vehicle calibration as directed by a calibration engineer, ride quality survey or passengers in either/both a test track and public road scenarios, or even machine learned from human driver data.

The autonomous mode controller may thus have access to a system that includes various "libraries", or sets of rules for determining various parameters of vehicle operation. Example libraries include a Speed Limiter library, a Longitudinal Action Filter library, and a Longitudinal Path Refiner library.

A Speed Limiter library will include rules for determining how quickly the vehicle may take corners, which may translate into commands for the powertrain's speed of operation and the steering subsystem's turning radius. When operating in Speed Limiter mode, the autonomous mode controller will use the Speed Limited library to decide the maximum speed that the vehicle may drive along given path. For example, a very straight path can be driven with a maximum speed governed by the posted speed limit, while a very curvy path (tight corners) may require the vehicle to slow down to speed that is below the speed limit. This problem may be described by two parameters: (i) maximum_ longitudinal_acceleration, which is the maximum longitudinal deceleration/acceleration that the vehicle will be permitted to implement when driving down an empty road (i.e. when no other vehicles/infrastructure interact with the autonomous vehicle), and (ii) maximum_lateral_acceleration, which is the maximum lateral acceleration that the vehicle will be permitted to implement when turning a corner when driving on an empty road. Given a path (parameterized by curvature vs. distance-along-path), and maximum_longitudinal_acceleration/maximum_lateral_acceleration parameters, the Speed Limiter will return a maximum speed profile (speed vs. distance-along-path) such that the autonomous vehicle will not exceed either longitudinal or lateral maximum acceleration. The Speed Limiter may use a mapping in its calculations such as:

$$\text{lateral\_acceleration} = \text{speed} * \text{speed} * \text{radius of curvature of the road curve}$$

in its calculations.

Both the maximum_lateral_acceleration and maximum_ longitudinal_acceleration parameters affect the character by which the vehicle approaches and navigates a corner. As such, they may varied by the rider-selectable mode feature.

A Longitudinal Action Filter Library will include rules that the system can use to determine when (i.e., at what distance) the braking system will begin to apply brakes, and how hard to apply the brakes in response to detecting other vehicles, stop signs, traffic lights, static obstacles and the like. The Longitudinal Action Filter feature decides what surrounding vehicles and infrastructure require longitudinal action. For example, from its onboard map, the autonomous vehicle knows where every single stop sign along its route is located. However, the vehicle does not need to take action (i.e., begin slowing for) a stop sign until the vehicle is within some specified distance from the sign. The distance at which a prescribed stop requires action is a function of speed, in that the faster the vehicle is travelling, the further away it must initiate stopping. Thus, the distance at which stops should be acted upon may be described as a table, indexed by current vehicle speed. The earlier that stopping is initiated, the more gentle the stopping experience. The later that stopping is initiated, the more abrupt the stopping experience. Thus, the calibration table describing when a stop should be initiated may be exposed for augmentation by the rider-selectable mode Similar to deciding when to take action on a stop, the Longitudinal Action Filter decides when to take action on surrounding dynamic obstacles (vehicles/bicycles/pedestrians). The autonomous mode controller may query this feature to answer questions like such as: when should the vehicle begin braking for a slow lead vehicle? If this distance is large, the vehicle will begin to slow gradually, whereas if this distance is small, the vehicle will brake later and more abruptly. These parameters have direct influence on the vehicle ride character and may be exposed for augmentation by the rider-selectable mode.

The Longitudinal Path Refiner library includes rules that the system can use to determine how quickly the vehicle's powertrain will cause the vehicle to accelerate, and/or how quickly the vehicle's braking system will cause the vehicle to decelerate in various sensed conditions. For example, when planning to stop in a given distance, the Longitudinal Refiner will determine what speed profile (speed vs. time) the vehicle should to track based on a desired acceleration profile (longitudinal acceleration vs. time). The acceleration profile can be shaped by desired maximum acceleration and deceleration limits. These limits can be deviated in specified conditions (for example, if the vehicle needs more authority to stop quickly), but when possible will be obeyed. Thus, prescribing open desired acceleration limits results in a sporty drive character, while prescribing tight desired acceleration limits results in a smooth drive character. As such, the desired acceleration and deceleration limits also may be exposed for augmentation by the rider-selectable modes.

For each of these libraries, the system may select or identify parameters that have a significant effect on ride character. These parameters, and various values for the parameters, may be stored in a data set of user-selectable comfort configurations. For example, a "comfortable" comfort configuration data set may include values that the system uses to determine and operate with relatively lower corner turning speeds and acceleration, and relatively higher braking distances, in certain situations. In comparison, a "confident" comfort configuration data set may include values that the system uses to determine and operate with relatively higher corner turning speeds and acceleration, and relatively shorter braking distances, in the same situations. In addition, a "comfortable" configuration may wait for a relatively larger gap between vehicles before merging into a traffic flow, while a "confident" configuration may accept a relatively smaller gap while increasing acceleration in order to appropriately merge into the gap.

The user interface of the vehicle may be configured to enable a rider to select a comfort configuration from a set of available configurations. The available configuration may be selectable from a set of candidate configurations, or may be set from a continuum of options between configurations, such as via a slider bar or dial, or by a voice command instructing the vehicle to move the configuration toward one end of the continuum (e.g., "sport") or the other (e.g., "comfort"). In addition, the autonomous mode controller may be able to access a memory device on which user profile data is stored. The profile data may include data indicating the preference of the user of the vehicle, based on prior entries by the user and/or learned actions and/or characteristics of the user over time. In response to the selection and/or retrieved profile data, the autonomous vehicle controller will apply the selected comfort configuration by retrieving and applying the comfort configuration data set that corresponds to the selected configuration to operate the vehicle subsystems. In addition, when the vehicle initializes, it may load and apply (i) a default comfort configuration data set, (ii) the comfort configuration data set that the vehicle used the last time that the vehicle was operated, or (iii) a comfort configuration data set that corresponds to a comfort configuration that is associated with a rider (such as in a rider profile). For example, the vehicle may default to a comfort configuration mode upon initialization. Optionally, the user interface may permit a rider to change the selected comfort configuration during run-time.

The rider may be able to select a comfort configuration prior to or during the travel of the autonomous vehicle to a destination. For example, the rider may enter the autonomous vehicle and prior to selecting a destination, select a comfort configuration. The autonomous vehicle may then cause the vehicle's subsystem to move the vehicle according to the selected comfort configuration. If the rider does not select a comfort configuration, the autonomous vehicle may cause the vehicle's subsystems to move the vehicle according to the default configuration, comfort configuration used for the previous travel to a destination, or comfort configuration associated with the rider.

In some embodiments, the rider may select a comfort configuration, and after the vehicle moves according to that selected comfort configuration, the rider may select a different comfort configuration before the vehicle arrives to the destination. In these embodiments, the system may only allow the rider to select a different comfort configuration when the vehicle is in a safe state. A safe state of the vehicle may be when the vehicle is stopped, or is moving with only minimal longitudinal acceleration. Once the different comfort configuration is selected, the system will then cause the vehicle to move according to that comfort configuration. There is no limit to the amount of times the comfort configuration may be changed, as long as the vehicle is in a safe state. In other embodiments, the rider may enter a different comfort configuration while the vehicle is not in a safe state. In these embodiments, the vehicle may save the selected comfort configuration and update the comfort configuration once the vehicle reaches a safe state. The rider may be informed of the update via the user interface of the vehicle.

Figure 2:
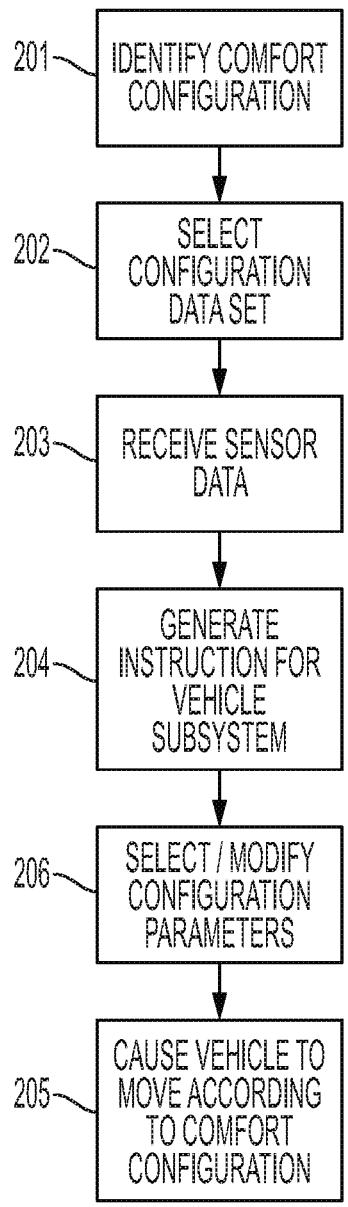
FIG. 2 is a flow diagram that illustrates an example method of controlling operation of an autonomous vehicle according to various comfort configurations.

FIG. 2 is a flowchart illustrating how an autonomous mode controller of an autonomous vehicle may control vehicle subsystems according to various rider-selectable comfort configurations. When the controller identifies a comfort configuration 201, it will access a configuration data set that corresponds to the selected comfort configuration 202. The controller also will receive sensor data from one or more autonomous driving sensors 203. In response to the received sensor data, the controller will generate an instruction for operation of a steering, braking, powertrain or other subsystem for operation of the autonomous vehicle 204. The instruction will include values that correspond to the sensed data and to one or more parameters of the configuration data set. The subsystem will then cause the autonomous vehicle to move according to the instruction 205.

When generating an instruction for operation of the subsystem for operation of the autonomous vehicle, the instruction may include different parameters depending on the selected comfort configuration. For example, a first comfort configuration may be a "confident" mode that reflects a relatively aggressive driving style, while a second comfort configuration may be a "comfortable" mode that reflects a smoother driving style. Various modes between, outside of, or alternative to these configurations may be available.

In some embodiments, the configuration data sets for each mode may vary based on geographic location. For example, a "confident" mode may permit more aggressive driving conditions on an open highway and in an area of lower population than it may permit in a residential street or in a congested city. Thus, the system may use the vehicle's GPS sensor, and/or location data embedded in or otherwise included with the map data that the vehicle is using, to determine the geographic location of the vehicle, and it may select or modify the configuration data set based on one or more characteristics of the geographic location.

For example, various geographic locations may be considered to be associated with configuration zones (as stored in a memory that is accessible to the system) and the system may select the configuration parameters or modify them based on the configuration zone in which the vehicle is traveling 206. The system may also determine when the vehicle moves from one configuration zone to another, and may update the configuration parameters based on the change in the configuration zone. Configuration zones may be identified based on defined geographic boundaries that are stored in memory and associated with geographic coordinates, or they may be dynamically determined as the system associates the vehicle's current geographic coordinates with characteristic that are associated with the coordinates. The characteristics of a configuration zone may include characteristics such as population density, local laws or regulations (for example, whether or not lane splitting is legal in the location of the vehicle), type of road, and/or local social norms or customs.

Thus, for example, while driving, the vehicle may determine its geographic coordinates and compare those coordinates to population data in a lookup table or by other means, or it may compare those coordinates to map data to determine the vehicle's configuration zone. If the population density of the vehicle's current location is greater than 1,000 people per square mile, or if the vehicle is driving on a city or residential neighborhood street, the system may determine that the vehicle is in an urban area and it may restrict the vehicle from operating in extreme "sport" modes, or it may modify certain parameters of the sport (or other) comfort configuration to provide for more conservative ride. If the population density of the vehicle's current location is less than 7 people per square mile, or if the vehicle is driving on a multi-lane highway, it may reduce or eliminate the modifications on the sport configuration's parameters, and/or it may modify parameters of a comfort configuration to be more appropriate for higher speeds.

For example, when implementing a turn, the mode may control operation of the vehicle's steering and powertrain subsystems. If the comfort configuration is the first comfort mode (referred to here as "confident," although other labels may be used), the controller may cause the steering subsystem to implement a turn with a relatively tighter turning radius and cause the powertrain subsystem to operate the vehicle through the turn at a relatively higher speed. In comparison, if the comfort configuration is the second comfort configuration (referred to here as "comfort" or "comfortable," although other labels may be used), the controller may cause the steering subsystem to implement a turn with a relatively wider turning radius and causing the powertrain subsystem to operate the vehicle through the turn at a relatively lower speed.

As another example, when operating a braking subsystem in response to detecting an object or location for which the vehicle must slow or stop, if the comfort configuration is the first comfort configuration, the controller may initiate the braking subsystem at a relatively shorter distance from the object, and optionally with a relatively higher force. If the comfort configuration is the second comfort configuration, the controller may initiate the braking subsystem at a relatively longer distance from the object, and optionally with a relatively lower force.

As another example, to move the vehicle from a still position, the controller will determine an acceleration that the powertrain will use to move the vehicle. If the identified comfort configuration is the first comfort configuration, the controller may cause the powertrain to apply a relatively higher acceleration to move the vehicle, such as by applying a higher torque to the powertrain. If the identified comfort configuration is the second comfort configuration, the controller may cause the powertrain subsystem to apply a relatively lower acceleration to move the vehicle, such as by applying a relatively lower torque to the powertrain.

FIG. 3 depicts an example of internal hardware that may be included in any of the electronic components of the system, such as the user's smartphone or a local or remote computing device in the system. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 625. In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

Various embodiments of the invention may include a computer-readable medium containing programming instructions that are configured to cause one or more processors and/or vehicle subsystems to perform the functions described in the context of the previous figures.

An optional display interface 630 may permit information from the bus 600 to be displayed on a display device 635 in visual, graphic or alphanumeric format. An audio interface and audio output (such as a speaker) also may be provided. Communication with external devices may occur using various communication devices 640 such as a wireless antenna, an RFID tag and/or short-range or near-field communication transceiver, each of which may optionally communicatively connect with other components of the device via one or more communication system. The communication device(s) 640 may be configured to be communicatively connected to a communications network, such as the Internet, a local area network or a cellular telephone data network.

The hardware may also include a user interface device 645 that allows for receipt of data from input devices 650 such as a keyboard, a mouse, a joystick, a touchscreen, a touch pad, a remote control, a pointing device and/or microphone. The user interface also may include a camera 620 that can capture video and/or still images.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A method of controlling operation of an autonomous vehicle, the method comprising, by an autonomous mode controller of an autonomous vehicle:
   identifying a user selectable comfort configuration prior to or during a drive of the autonomous vehicle to a destination;
   accessing a configuration data set comprising parameters and values for operating the autonomous vehicle according to the identified comfort configuration;
   determining a geographic location of the autonomous vehicle via a global positioning system sensor;
   modifying the configuration data set according to the geographic location of the autonomous vehicle;
   receiving sensor data from one or more autonomous driving sensors;
   in response to the received sensor data, generate an instruction for operation of a subsystem of the autonomous vehicle, wherein the instruction includes values that correspond to the received sensor data and to one or more parameters contained in the modified configuration data set; and
   by the subsystem of the autonomous vehicle, causing the autonomous vehicle to move according to the instruction.

2. The method of claim 1, wherein modifying the configuration data set according to the geographic location of the autonomous vehicle comprises:
   using the geographic location of the autonomous vehicle to determine a configuration zone that the autonomous vehicle is located in; and
   modifying the configuration data set according to the configuration zone.

3. The method of claim 2, wherein, if the configuration zone that the autonomous vehicle is located in changes from a first configuration zone to a second configuration zone during the drive of the autonomous vehicle to the destination, the autonomous mode controller modifies the configuration data set according to the second configuration zone.

4. The method of claim 2, wherein:
   using the geographic location of the autonomous vehicle to determine a configuration zone that the autonomous vehicle is located in comprises determining a population density of the configuration zone; and
   modifying the configuration data set according to the configuration zone comprises restricting a range of one or more parameters of the configuration data set in response to determining that the population density exceeds a threshold.

5. The method of claim 1, wherein identifying the comfort configuration comprises receiving a user selection of the comfort configuration via a user interface.

6. The method of claim 5, wherein receiving a user selection of the comfort configuration only occurs when the autonomous vehicle is in a safe state.

7. The method of claim 1, wherein identifying the comfort configuration comprises:
   detecting that the autonomous vehicle is in an initialization mode; and
   as part of the initialization mode, selecting a default comfort configuration.

8. The method of claim 1, wherein:
   the subsystem comprises a steering subsystem and a powertrain subsystem; and
   causing the subsystem to move the autonomous vehicle according to the instruction comprises:
   if the identified comfort configuration is a first comfort configuration, causing the steering subsystem to implement a turn with a relatively tighter turning radius and causing the powertrain subsystem to operate the vehicle through the turn at a relatively higher speed, and
   if the identified comfort configuration is a second comfort configuration, causing the steering subsystem to implement a turn with a relatively wider turning radius and causing the powertrain subsystem to operate the vehicle through the turn at a relatively lower speed.

9. The method of claim 1, wherein:
   the subsystem comprises a braking subsystem; and
   causing the subsystem to move the autonomous vehicle according to the instruction comprises, in response to detecting an object or location for which the vehicle must slow or stop:
   if the identified comfort configuration is a first comfort configuration, initiating the braking subsystem at a relatively shorter distance from the object, and
   if the identified comfort configuration is a second comfort configuration, initiating the braking subsystem at a relatively longer distance from the object.

10. The method of claim 9, wherein causing the subsystem to move the autonomous vehicle according to the instruction also comprises, in response to detecting the object or location for which the vehicle must slow or stop:
    if the identified comfort configuration is the first comfort configuration, applying the braking subsystem with a relatively higher force, and
    if the identified comfort configuration is a second comfort configuration, applying the braking subsystem with a relatively lower force.

11. The method of claim 1, wherein:
    the subsystem comprises a powertrain; and
    causing the subsystem to move the autonomous vehicle according to the instruction comprises, when initially moving the autonomous vehicle from a still position:
    if the identified comfort configuration is a first comfort configuration, causing the powertrain to apply a relatively higher acceleration to move the autonomous vehicle, and
    if the identified comfort configuration is a second comfort configuration, causing the powertrain to apply a relatively lower acceleration to move the autonomous vehicle.

12. The method of claim 1, wherein:
    the configuration data set comprises a range of allowable speeds or maximum lateral acceleration values;

determining the geographic location comprises determining a curvature of a road on which the autonomous vehicle is traveling;

modifying the configuration data set according to the geographic location of the autonomous vehicle comprises using the determined curvature to select an allowable speed or an allowable maximum lateral acceleration value from the range.

13. The method of claim 1, wherein:

the configuration data set comprises a range of acceleration limits;

determining the geographic location comprises determining a distance between the autonomous vehicle and an object at which the autonomous vehicle will stop;

modifying the configuration data set according to the geographic location of the autonomous vehicle comprises using the determined curvature to select an allowable speed or an allowable maximum lateral acceleration value from the range.

14. A system for controlling operation of an autonomous vehicle, the system comprising:

an autonomous mode controller;
a subsystem;
a global positioning system sensor;
a memory device; and
one or more autonomous driving sensors;
wherein the autonomous mode controller is configured to:
identify a user selectable comfort configuration prior to or during a drive of the autonomous vehicle to a destination,
access, from a memory, a configuration data set comprises parameters and values for operating the autonomous vehicle according to the identified comfort configuration,
determine a geographic location of the autonomous vehicle via the global positioning system sensor;
modify the configuration data set according to the geographic location of the autonomous vehicle;
receive sensor data from the one or more autonomous driving sensors;
in response to the received sensor data, generate an instruction for operation of a subsystem of the autonomous vehicle, wherein the instruction includes values that correspond to the received sensor data and to one or more parameters contained in the modified configuration data set; and
cause the subsystem of the autonomous vehicle to move the autonomous vehicle according to the instruction.

15. The system of claim 11, wherein the autonomous mode controller is configured to modify the configuration data set according to the geographic location of the autonomous vehicle by:

using the geographic location of the autonomous vehicle to determine a configuration zone that the autonomous vehicle is located in; and modifying the configuration data set according to the configuration zone.

16. The system of claim 15, wherein the autonomous mode controller is further configured to, if the configuration zone that the autonomous vehicle is located in changes from a first configuration zone to a second configuration zone during the drive of the autonomous vehicle to the destination, modify the configuration data set according to the second configuration zone.

17. The system of claim 14, wherein the system further comprises a user interface and identifying the comfort configuration comprises the autonomous mode controller being further configured to receive a user selection of the comfort configuration via the user interface.

18. The system of claim 17, wherein the autonomous mode controller is configured to receive a user selection of the comfort configuration only when the autonomous vehicle is in a safe state.

19. The system of claim 14, wherein the autonomous mode controller is further configured to, when identifying the comfort configuration:

detect that the autonomous vehicle is in an initialization mode; and as part of the initialization mode, select a default comfort configuration.

20. The system of claim 14, wherein:

the subsystem comprises a steering subsystem and a powertrain subsystem; and the instruction for operation of a subsystem of the autonomous vehicle comprises an instruction to:

if the identified comfort configuration is a first comfort configuration, cause the steering subsystem to implement a turn with a relatively tighter turning radius and cause the powertrain subsystem to operate the vehicle through the turn at a relatively higher speed, and if the identified comfort configuration is a second comfort configuration, cause the steering subsystem to implement a turn with a relatively wider turning radius and cause the powertrain subsystem to operate the vehicle through the turn at a relatively lower speed.

21. The system of claim 11, wherein:

the subsystem comprises a braking subsystem; and the instruction for operation of a subsystem of the autonomous vehicle comprises an instruction to, in response to the autonomous mode controller detecting an object or location for which the vehicle must slow or stop:

if the identified comfort configuration is a first comfort configuration, initiate the braking subsystem at a relatively shorter distance from the object, and if the identified comfort configuration is a second comfort configuration, initiate the braking subsystem at a relatively longer distance from the object.

22. The system of claim 21, wherein the instruction for operation of a subsystem of the autonomous vehicle comprises an instruction to, in response to the autonomous mode controller detecting the object or location for which the vehicle must slow or stop:

if the identified comfort configuration is the first comfort configuration, apply the braking subsystem with a relatively higher force, and if the identified comfort configuration is a second comfort configuration, apply the braking subsystem with a relatively lower force.

23. The system of claim 11, wherein:

the subsystem comprises a powertrain; and the autonomous mode controller is configured to cause the subsystem to move the autonomous vehicle according to the instruction by, when initially moving the autonomous vehicle from a still position:

if the identified comfort configuration is a first comfort configuration, causing the powertrain to apply a relatively higher acceleration to move the autonomous vehicle, and if the identified comfort configuration is a second comfort configuration, causing the powertrain to apply a relatively lower acceleration to move the autonomous vehicle.

* * * * *